Patented July 10, 1951

2,559,665

UNITED STATES PATENT OFFICE 2,559,665

METHOD OF MAKING RESIN BONDED ABRASIVE ARTICLES

Kernell G. Ries and George J. Goepfert, Niagara Falls, N. Y., assignors to The Carborundum Company, Niagara Falls, N. Y., a corporation of Delaware No Drawing. Application February 11, 1947, Serial No. 727,933

10 Claims. (Cl. 51—298)

This invention relates to a method of making improved abrasive articles bonded with a resinous bond comprising a heat-hardened resin containing small particles of thermoplastic resin distributed through it.

A great many bonded abrasive articles such as abrasive wheels or stones are made by bonding abrasive grains with a heat-hardened resin, particularly with a phenol-aldehyde resin. Grinding wheels made with such resins are used for many purposes such as the snagging of steel castings, grinding steel billets to prepare them for rolling, and cutting steel. Such wheels have a high cutting rate and grinding efficiency, or ratio of material removed to wheel loss, but they do not develop very good surfaces in comparison with wheels made with other types of bonds and particularly those made with shellac or vulcanized rubber. In the abrasive industry it has been felt that one reason for the improved surfaces obtainable with shellac and vulcanized rubber is that the bonds are softenable by heat and that the heat of grinding softens these bonds sufficiently to provide a sort of buffing action. The heat-hardened resins such as the phenol-formaldehyde resins are heat-resistant and do not soften in use.

It has previously been suggested that thermoplastic resins be admixed with heat-hardenable resins to modify the properties of the heat-hardenable resins. One method of doing this is to mix the abrasive grain with the two kinds of resin and with a solvent for the heat-hardenable resin and obtain a mix in condition such that it can be rolled, as is done in making rubber bonded articles. That process has not been used commercially to any extent.

It has also been suggested that the hardened resin bond be modified by distributing through it small particles of thermoplastic resin. The method for doing this consists in first coating the abrasive grains with a solvent for a powdered heat-hardenable resin and with such powdered resin in proportions to obtain a dry granular mix in which each of the grains is coated, admixing such resin coated grains with an aqueous dispersion or synthetic latex of the thermoplastic resin, drying this up with additional powdered heat-hardenable resin, and finally drying to remove the moisture from the synthetic latex. Such process has been used to a considerable extent but the resin bond on the grains made by that process is so dry and devoid of plasticity that it is necessary to hot press in order to obtain sufficient fluxing of the resin coatings so that the bond on the individual grains will flow and join up to form the completed article. Such process is expensive because it requires a very considerable amount of mold equipment. Furthermore the process requires that the grains be dried and such a step adds to the cost and delays the process.

We have discovered a method of making resin bonded abrasives with a heat-hardenable and a thermoplastic resin which gives the improved article obtainable by the process just described but is much better adapted for commercial operations. The thermoplastic resin is distributed through a matrix of the heat-hardened resin as in the case of the process where the thermoplastic resin is added in the form of an aqueous dispersion and the improved results obtainable from such structure are obtained by articles made according to our invention.

Our process is carried out as follows:

The abrasive grains are first admixed with a solvent for the powdered heat-hardenable resin which is to be subsequently added, an excess of the solvent over that normally used in making an ordinary resin bonded article with the amount of powdered heat-hardenable resin added in the first step and over that used in the process where the thermoplastic resin is added as a latex being employed. Powdered heat-hardenable resin is then added and mixing is continued until the resin solvent on the grains penetrates the powdered resin and the mix approaches the condition where it appears wet. Just before it reaches a very sticky condition the grains are mixed with a powdered thermoplastic resin which coats the grains and is caused to adhere to them by reason of the tackiness of the coatings of heat-hardenable resin and solvent which are on the grains. After a few minutes the sticky heat-hardenable resin coatings soak through and wet up the thermoplastic resin, which is not soluble in the solvent used, and the grains are then mixed with additional powdered heat-hardenable resin in a quantity sufficient to satisfy the solvent action of the inner coating of resin and solvent and provide grains which are dry to the touch and readily distributable in a mold. Such grains are then cold molded and heated to harden the heat-hardenable resin and to flux the finely divided particles of the thermoplastic resin into agglomerates which are found to be distributed through the matrix of the heat-hardened resin. The articles thus obtained have the high cutting rate and efficiency characteristic of resins bonded solely with heat-hardened resin combined with the improved finishes obtainable with wheels made with shellac or vulcanized rubber bonds. They therefore are quite similar to the articles made by the process which uses the aqueous dispersion of the thermoplastic resin and, in fact, for some purposes, are more efficient. In addition, our process has the advantages referred to above, namely, that it is quick, does not require a large number of hydraulic presses per unit of output as does the hot press process, and is therefore much more suitable for commercial operations.

The following examples are illustrative but not limitative of methods for carrying out our invention.

Example I

A wheel for grinding steel billets 16 inches in diameter, 2½ inches thick and having an arbor hole 6 inches in diameter (16" x 2½" x 6") was made from the following mix, all parts being by weight:

|   | Parts |
|---|---|
| 12 grit fused alumina abrasive grain | 38 |
| 14 grit fused alumina abrasive grain | 19 |
| 16 grit fused alumina abrasive grain | 19 |
| "BR-7534" liquid resin | 3.8 |
| "BR-2417" powdered resin | 8.5 |
| Powdered cryolite | 8.5 |
| No. 202 powdered "Geon" resin | 3.2 |

The three sizes of abrasive grains were thoroughly mixed and were then mixed with the liquid resin in a "Hobart" mixer until the resin had been uniformly distributed over the abrasive grains. The "BR-7534" liquid resin is a liquid heat-hardenable phenol-formaldehyde condensation product made by the Bakelite Corporation. It is an alkaline catalyzed resin having a viscosity of about 400 centipoises at 25° C. and is convertible by heat to a strong, infusible and insoluble resinoid.

The "BR-2417," which is a powdered heat-hardenable phenol-formaldehyde condensation product and, like the "BR-7534" is convertible by heat to a tough, infusible insoluble resinoid, was mixed with the cryolite and 13.8 parts of this mixture were added in the mixer to the wetted abrasive grains. Mixing was continued until the mix became sticky because of the comparatively large amount of liquid resin, whereupon the powdered "Geon" resin was added. The "Geon" resin is a copolymer of 90 parts vinyl chloride and 10 parts vinylidene chloride made by the B. F. Goodrich Company. The "Geon" resin first tended to dry up the mix as it became distributed over the abrasive grains but upon continued mixing the mass again became sticky, whereupon the remaining 3.2 parts of the mixture of "BR-2417" and powdered cryolite was added. Upon further mixing, the resin became distributed over the abrasive grains and a mix which was dry to the touch and in which the resins and filler were uniformly distributed over the grains was obtained. The mix was inherently plastic enough to be cold moldable.

24,320 grams of this mixture were put into a mold 16⅜ inches in diameter and provided with an arbor pin 5⅞ inches in diameter. The mold and its contents were put into a hydraulic press and pressed to such a volume that the mixture had a density of 47 grams per cubic inch. The resulting article was put into an oven and cured according to the following cycle:

4 hours at 225° F.
1 hour at 250° F.
16 hours at 300° F.

It was then cooled to 280° F. in one hour and to 125° F. at the rate of 25° per hour. The wheel was then finished according to usual practices. It was found to be very satisfactory for grinding steel billets.

Example II

An 8" x 1" x ⅝" wheel for use on a portable grinder was made from the following mix, the ingredients being added in the order listed and the method being that described in the previous example:

|   | Parts |   |
|---|---|---|
| 12 grit fused alumina | 38 |   |
| 14 grit fused alumina | 38 |   |
| "BR-7534" liquid resin | 5.4 |   |
| "BR-2417" powdered resin | 6.1 | 12.2 |
| Powdered cryolite | 6.1 |   |
| VYHH powdered resin | 3.2 |   |
| "BR-2417" powdered resin | 1.6 | 3.2 |
| Powdered cryolite | 1.6 |   |

The "VYHH" resin is a powdered copolymer of 80% vinyl chloride and 20% vinyl acetate manufactured by the Union Carbide and Carbon Corporation.

3120 grams of the mixture were charged into a mold and cold pressed to a density of 47 grams per cubic inch. The article was cured and then cooled according to the cycle given in Example I.

The cured wheel was finished according to standard practice in the abrasive industry. It was a fast-cutting wheel which gave a finish comparable to that obtainable with rubber bonded wheels of the same grit composition.

Our invention may be carried out using different kinds of heat-hardenable resins and different kinds of thermoplastic resins. For example, as the heat-hardenable resins we may use phenol-formaldehyde, amine aldehyde including urea, melamine and aniline formaldehyde, and amine modified phenol-aldehyde. The thermoplastic resins should have a softening point sufficiently high so that they do not flux until the heat-hardenable resin has set up to the point where it does not allow the thermoplastic resin to flow through it and low enough so that it is fluxed and the fine particles which are put into the mix as a powder can weld together and form particles consisting of aggregates of a considerable number of such powdered particles. Among the thermoplastic resins which we may use are polymerized vinyl esters such as polyvinyl acetate, polyvinyl chloride and copolymers of the vinyl acetate and the chloride, copolymers of vinylidene chloride and vinyl chloride, partial acetals of polyvinyl alcohol such as the partial formaldehyde or butyraldehyde acetal of hydrolized polyvinyl acetate, and polystyrene and copolymers thereof with other compatible polymerizable compounds.

Different solvents may be used provided only that they are solvents for the heat-hardenable resin and not for the thermoplastic resins. Examples of such solvents are high boiling aldehydes such as furfural and benzaldehyde and normally liquid heat-hardenable synthetic resins such as the liquid initial reaction product of phenol and formaldehyde. Fillers may be used in accordance with conventional practice and other modifications common in the abrasive art may be employed with departing from the spirit of the invention, the scope of which is defined in the following claims.

We claim:

1. A method of making a molded resin bonded abrasive article which comprises mixing abrasive grains with a solvent for a heat-hardenable synthetic resin, mixing the wetted grains with such a heat-hardenable resin in powdered form until the powdered resin becomes thoroughly wetted with the solvent and forms coatings about the individual grains which are adhesive, then mixing such grains with a powdered theromoplastic resin which is insoluble in the said solvent and continuing the mixing until the inner coatings penetrate the powdered thermoplastic resin and make the grains somewhat sticky, adding more of the said powdered heat-hardenable resin in a quantity sufficient to dry up the coatings on the grains and provide a distributable mass, pressing an article from the mixture in a mold, and heating the article to harden the heat-hardenable resin and to soften the thermoplastic resin and cause a number of particles of such powdered resin to agglomerate and become distributed through the matrix of the heat-hardened resin, the softening point of said thermoplastic resin being high enough to prevent the resin from flowing through the heat-hardenable resin and low enough so that the resin is fluxed and a number of particles of the resin can weld together and form aggregates.

2. A method of making a molded resin bonded abrasive article which comprises mixing abrasive grains with a solvent for a heat-hardenable synthetic resin comprising a high-boiling aldehyde, mixing the wetted grains with such a heat-hardenable resin in powdered form until the powdered resin becomes thoroughly wetted with the solvent and forms coatings about the individual grains which are adhesive, then mixing such grains with a powdered thermoplastic resin which is insoluble in the said solvent and continuing the mixing until the inner coatings penetrate the powdered thermoplastic resin and make the grains somewhat sticky, adding more of the said powdered heat-hardenable resin in a quantity sufficient to dry up the coatings on the grains and provide a distributable mass, pressing an article from the mixture in a mold, and heating the article to harden the heat-hardenable resin and to soften the thermoplastic resin and cause a number of particles of such powdered resin to agglomerate and become distributed through the matrix of the heat-hardened resin, the softening point of said thermoplastic resin being high enough to prevent the resin from flowing through the heat-hardenable resin and low enough so that the resin is fluxed and a number of particles of the resin can weld together and form aggregates.

3. A method of making a molded resin bonded abrasive article which comprises mixing abrasive grains with a solvent for a heat-hardenable synthetic resin comprising a normally liquid heat-hardenable phenol-aldehyde condensation product, mixing the wetted grains with such a heat-hardenable powdered resin until the powdered resin becomes thoroughly wetted with the solvent and forms coatings about the individual grains which are adhesive, then mixing such grains with a powdered thermoplastic resin which is insoluble in the said solvent and continuing the mixing until the inner coatings penetrate the powdered thermoplastic resin and make the grains somewhat sticky, adding more of the said powdered heat-hardenable resin in a quantity sufficient to dry up the coatings on the grains and provide a distributable mass, pressing an article from the mixture in a mold, and heating the article to harden the heat-hardenable resin and to soften the thermoplastic resin and cause a number of particles of such powdered resin to agglomerate and become distributed through the matrix of the heat-hardenable resin, the softening point of said thermoplastic resin being high enough to prevent the resin from flowing through the heat-hardenable resin and low enough so that the resin is fluxed and a number of particles of the resin can weld together and form aggregates.

4. A method of making a molded resin bonded abrasive article which comprises mixing abrasive grains with a solvent for a heat-hardenable phenol resin, mixing the wetted grains with a powdered heat-hardenable phenol-aldehyde resin until the powdered resin becomes thoroughly wetted with the solvent and forms coatings about the individual grains which are adhesive, then mixing such grains with a powdered thermoplastic resin which is insoluble in the said solvent and continuing the mixing until the inner coatings penetrate the powdered thermoplastic resin and make the grains somewhat sticky, adding more of the said powdered heat-hardenable resin in a quantity sufficient to dry up the coatings on the grains and provide a distributable mass, pressing an article from the mixture in a mold. and heating the article to harden the heat-hardenable resin and to soften the thermoplastic resin and cause a number of particles of such powdered resin to agglomerate and become distributed through the matrix of the heat-hardened resin, the softening point of said thermoplastic resin being high enough to prevent the resin from flowing through the heat-hardenable resin and low enough so that the resin is fluxed and a number of particles of the resin can weld together and form aggregates.

5. A method of making a molded resin bonded abrasive article which comprises mixing abrasive grains with a solvent for a heat-hardenable amine-aldehyde resin, mixing the wetted grains with a powdered heat-hardenable amine-aldehyde resin until the powdered resin becomes thoroughly wetted with the solvent and forms coatings about the individual grains which are adhesive, then mixing such grains with a powdered thermoplastic resin which is insoluble in the said solvent and continuing the mixing until the inner coatings penetrate the powdered thermoplastic resin and make the grains somewhat sticky, adding more of the said powdered heat-hardenable resin in a quantity sufficient to dry up the coatings on the grains and provide a distributable mass, pressing an article from the mixture in a mold, and heating the article to harden the heat-hardenable resin and to soften the thermoplastic resin and cause a number of particles of such powdered resin to agglomerate and become distributed through the matrix of the heat-hardened resin, the softening point of said thermoplastic resin being high enough to prevent the resin from flowing through the heat-hardenable resin and low enough so that the resin is fluxed and a number of particles of the resin can weld together and form aggregates.

6. A method of making a molded resin bonded abrasive article which comprises mixing abrasive grains with a solvent for a heat-hardenable amine-modified-phenol-aldehyde resin, mixing the wetted grains with a powdered heat-hardenable amine-modified phenol-aldehyde resin until the powdered resin becomes thoroughly wetted with the solvent and forms coatings about the individual grains which are adhesive, then mixing such grains with a powdered thermoplastic resin which is insoluble in the said solvent and continuing the mixing until the inner coatings penetrate the powdered thermoplastic resin and make the grains somewhat sticky, adding more of the said powdered heat-hardenable resin in a quantity sufficient to dry up the coatings on the grains and provide a distributable mass, pressing an article from the mixture in a mold, and heating the article to harden the heat-hardenable resin and to soften the thermoplastic resin and cause a number of particles of such powdered resin to agglomerate and become distributed through the matrix of the heat-hardened resin, the softening point of said thermoplastic resin being high enough to prevent the resin from flowing through the heat-hardenable resin and low enough so that the resin is fluxed and a number of particles of the resin can weld together and form aggregates.

7. A method of making a molded resin bonded abrasive article which comprises mixing abrasive grains with a solvent for a heat-hardenable synthetic resin, mixing the wetted grains with such a heat-hardenable resin in powdered form until the powdered resin becomes thoroughly wetted with the solvent and forms coatings about the individual grains which are adhesive, then mixing such grains with a powdered thermoplastic resin which is insoluble in the said solvent and which comprises a vinyl ester and continuing the mixing until the inner coatings penetrate the powdered thermoplastic resin and make the grains somewhat sticky, adding more of the said powdered heat-hardenable resin in a quantity sufficient to dry up the coatings on the grains and provide a distributable mass, pressing an article from the mixture in a mold, and heating the article to harden the heat-hardenable resin and to soften the thermoplastic resin and cause a number of particles of such powdered resin to agglomerate and become distributed through the matrix of the heat-hardened resin, the softening point of said thermoplastic resin being high enough to prevent the resin from flowing through the heat-hardenable resin and low enough so that the resin is fluxed and a number of particles of the resin can weld together and form aggregates.

8. A method of making a molded resin bonded abrasive article which comprises mixing abrasive grains with a solvent for a heat-hardenable synthetic resin, mixing the wetted grains with such a heat-hardenable resin in powdered form until the powdered resin becomes thoroughly wetted with the solvent and forms coatings about the individual grains which are adhesive, then mixing such grains with a powdered thermoplastic resin which is insoluble in the said solvent and which comprises a vinyl acetal and continuing the mixing until the inner coatings penetrate the powdered thermoplastic resin and make the grains somewhat sticky, adding more of the said powdered heat-hardenable resin in a quantity sufficient to dry up the coatings on the grains and provide a distributable mass, pressing an article from the mixture in a mold, and heating the article to harden the heat-hardenable resin and to soften the thermoplastic resin and cause a number of particles of such powdered resin to agglomerate and become distributed through the matrix of the heat-hardened resin, the softening point of said thermoplastic resin being high enough to prevent the resin from flowing through the heat-hardenable resin and low enough so that the resin is fluxed and a number of particles of the resin can weld together and form aggregates.

9. A method of making a molded resin bonded abrasive article which comprises mixing abrasive grains with a solvent for a heat-hardenable synthetic resin, mixing the wetted grains with such a heat-hardenable resin in powdered form until the powdered resin becomes thoroughly wetted with the solvent and forms coatings about the individual grains which are adhesive, then mixing such grains with a powdered thermoplastic resin which is insoluble in the said solvent and which comprises a copolymer including a vinyl ester and continuing the mixing until the inner coatings penetrate the powdered thermoplastic resin and make the grains somewhat sticky, adding more of the said powdered heat-hardenable resin in a quantity sufficient to dry up the coatings on the grains and provide a distributable mass, pressing an article from the mixture in a mold, and heating the article to harden the heat-hardenable resin and to soften the thermoplastic resin and cause a number of particles of such powdered resin to agglomerate and become distributed through the matrix of the heat-hardened resin, the softening point of said thermoplastic resin being high enough to prevent the resin from flowing through the heat-hardenable resin and low enough so that the resin is fluxed and a number of particles of the resin can weld together and form aggregates.

10. A method of making a molded resin bonded abrasive article which comprises mixing abrasive grains with a solvent for a heat-hardenable phenol-formaldehyde resin comprising a normally liquid heat-hardenable phenol-aldehyde condensation product, mixing the wetted grains with a powdered heat-hardenable phenol-formaldehyde resin until the powdered resin becomes thoroughly wetted with the solvent and forms coatings about the individual grains which are adhesive, then mixing such grains with a powdered thermoplastic resin which is insoluble in the said solvent and which comprises a copolymer including a vinyl ester and continuing the mixing until the inner coatings penetrate the powdered thermoplastic resin and make the grains somewhat sticky, adding more of the said powdered heat-hardenable resin in a quantity sufficient to dry up the coatings on the grains and provide a distributable mass, pressing an article from the mixture in a mold, and heating the article to harden the heat-hardenable resin and to soften the thermoplastic resin and cause a number of particles of such powdered resin to agglomerate and become distributed through the matrix of the heat-hardened resin, the softening point of said thermoplastic resin being high enough to prevent the resin from flowing through the heat-hardenable resin and low enough so that the resin is fluxed and a number of particles of the resin can weld together and form aggregates.

KERNELL G. RIES.
GEORGE J. GOEPFERT.

REFERENCES CITED

The following references are of record in the file of this patent:

UNITED STATES PATENTS

| Number | Name | Date |
| --- | --- | --- |
| Re. 19,318 | Martin | Sept. 18, 1934 |
| 1,901,325 | Novotny | Mar. 14, 1933 |
| 1,950,641 | Upper | Mar. 13, 1934 |
| 1,993,821 | Benner et al. | Mar. 12, 1935 |
| 2,067,517 | Robie | Apr. 6, 1937 |
| 2,111,006 | Robie | Mar. 15, 1938 |
| 2,272,873 | Kistler | Feb. 10, 1942 |

Certificate of Correction

Patent No. 2,559,665 July 10, 1951

KERNELL G. RIES ET AL.

It is hereby certified that error appears in the printed specification of the above numbered patent requiring correction as follows:

Column 4, line 70, for "with" read *without*; column 5, line 7, for "theromoplastic" read *thermoplastic*; column 6, line 3, for "heat-hardenable" read *heat-hardened*; line 12, before "resin" insert *-aldehyde*;

and that the said Letters Patent should be read as corrected above, so that the same may conform to the record of the case in the Patent Office.

Signed and sealed this 18th day of December, A. D. 1951.

[SEAL]

THOMAS F. MURPHY,
*Assistant Commissioner of Patents.*